INVENTORS
DIETER FRANK
JOCHEN POLYSIUS
BY
Wilson + Fraser 3,481,636
MOUNTING FOR A BEARING RING ON A
ROTARY DRUM
Dieter Frank and Jochen Polysius, Neubeckum, Germany, assignors to Polysius G.m.b.H., Neubeckum, Westphalia, Germany, a corporation of Germany
Filed Feb. 26, 1968, Ser. No. 708,156
Int. Cl. F16d 1/06; B60b 27/06
U.S. Cl. 287—52.05                                          8 Claims

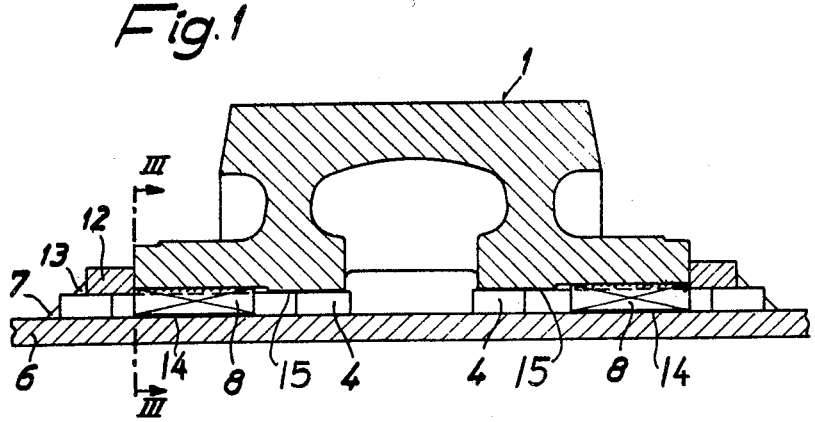
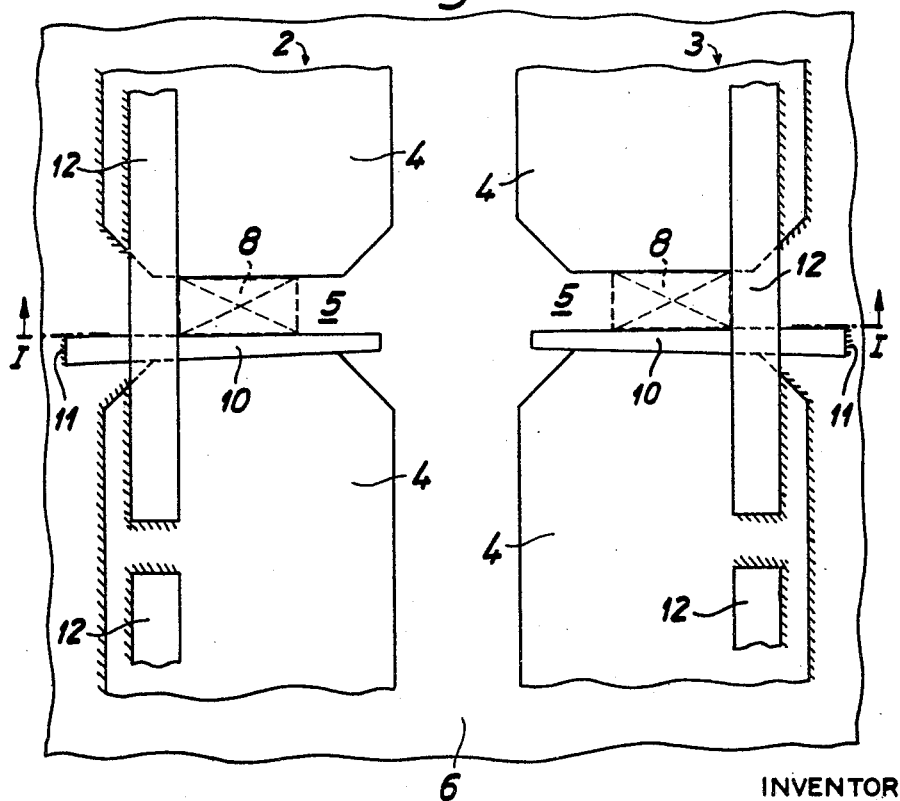

ABSTRACT OF THE DISCLOSURE

A bearing ring mounting for rotary drums, such as cement kilns, arranged to accommodate thermal expansion of the drum relative to the ring by welding indexing members to the inner face of the ring and welding spacer plates around the periphery of the drum. Intermediate spaces between the plates register with the indexing members and are of greater width than the members. Gibs fill the space between the plates and indexing members. Radial play is permitted between the outer periphery of the plates and the inner diameter of the ring, and between the tops of the index members and the outer diameter of the drum to permit relative expansion and contraction of ring and drum.

---

This invention relates to a bearing ring mounting for a rotary drum, wherein the bearing ring has a plurality of indexing elements, keys or followers, hereafter termed "followers," distributed uniformly about its inner periphery and which engage in the spaces between projections provided on the outer periphery of the rotary drum, the radial dimensions being so chosen that free thermal expansion of the drum radially of the bearing ring is possible.

The known bearing ring mounting of the above type developed by the applicant is differentiated from earlier constructions by completely uniform distribution over the entire periphery of bearing ring and drum of the forces arising during operation of the rotary drum.

In the known construction the followers comprise teeth machined on the bearing ring periphery. With very large bearing ring diameters (e.g. exceeding four meters) such a construction runs into difficulties, since in this case it is hardly possible to use ordinary machine tools to form the tooth-like followers on the bearing ring periphery.

It is also known to form the followers distributed round the inner bearing ring periphery as individual strips which are bolted or riveted to the ring. The width of the followers then corresponds to the spaces intermediate the projections provided on the outer drum periphery, into which the strip-like followers thus readily fit. To insure that all followers and projections are uniformly loaded during operation with such a construction, both manufacture of followers and projections and assembly of the individual followers must be effected with great precision.

The object of the invention is thus to develop a bearing ring mounting for a rotary drum, suitable even for large diameters, which is particularly simple to manufacture and install but which also insures that all followers and projections provide uniform support during operation.

According to the invention this object is achieved in that the followers are welded on to the bearing ring, and their intermediate spaces, which are made of greater width than the followers, are closed by wedges.

With the bearing ring mounting of the invention, the spaces intermediate adjacent projections provided on the outer drum periphery are thus not closed by followers made and installed with great accuracy and engaging with a sliding fit, but by means of followers made with considerably greater tolerances and affixed to the bearing ring by a simple welded joint, and by wedges forced into the intermediate spaces. The wedges are obviously inserted only so far into the spaces that radial relative slippage between projections and followers is still possible when the drum expands thermally. To keep the wedges in this not very rigid position, they are preferably lightly welded to the drum surface after installation.

With the construction of the invention, which is suitable even for the largest diameter bearing rings, manufacture and assembly of the parts needed for the bearing ring mounting is considerably simpler and cheaper, though still permitting uniform loading of all the projections and followers distributed about the drum periphery and also free thermal expansion of the rotary drum relative to the bearing ring.

These and further details of the invention will appear from the following description of two embodiments shown in the drawings. In these:

FIGURE 1 is a section through rotary drum periphery and bearing ring on line I—I of FIGURE 2;

FIGURE 2 is a plan view of part of the drum periphery for taking the bearing ring, with the bearing ring removed to illustrate details of its mounting;

Figure 4:
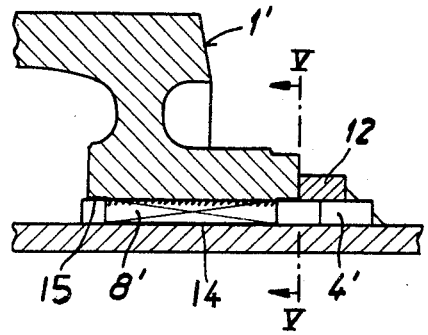
FIGURE 4 is a section (corresponding to the right half of FIGURE 1) through a second embodiment of the invention.

In the part of its outer periphery which is to receive a bearing ring 1, the rotary drum comprises two rows 2, 3 of projections 4, formed of plates arcuately bent to fit the drum periphery. Between each two successive projections 4 of the same row is an intermediate space 5. The plate-like projections 4 are welded to the drum casing 6 (welding seams 7).

Figure 3:
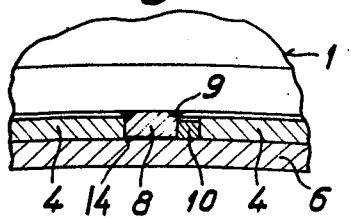
FIGURE 3 is a section on line III—III of FIGURE 1.

On its inner periphery the bearing ring 1 has a plurality of uniformly distributed followers 8, also arranged in two rows, with the followers in the two rows aligned in pairs longitudinally of the drum (see FIGURE 2). Followers 8 are welded to the inner periphery of bearing ring 1 (welding seams 9, see FIGURE 3). For this reason the bearing ring 1 in the embodiment shown in FIGURES 1–3 is made with somewhat enlarged inner diameter in the area of the contact surfaces of followers 8 (see FIGURE 1).

The spaces 5 intermediate successive plate-shaped projections 4 are made greater in width than followers 8. To close these intermediate spaces 5 there are provided gibs or wedges 10: the distance these are forced into the intermediate spaces 5 are however such that relative radial slippage between plate-shaped projections 4 and followers 8 is still possible. This relative radial movement is permitted by play (represented by the thickened line 14) between the inner side of followers 8 and the outside of drum casing 6, and by corresponding play (represented by the thickened lines 15) between the remaining inner surface of bearing ring 1 and the outer surface of the plate-like projections 4. After installation the wedges 10 are lightly welded to the drum periphery (welding seam 11). The bearing ring 1 is positioned axially by limiting strips 12 which are welded to the plate-shaped projections 4.

Figure 5:
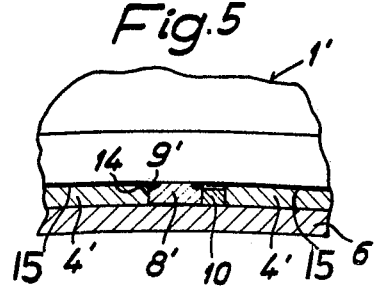
FIGURE 5 is a section on line V—V of FIGURE 4.

In the further embodiment of the invention shown in FIGURES 4 and 5, the plate-shaped projections $4^1$ are provided, on the side faces which abut against followers $8^1$, with a bevel 14 which takes welding seam $9^1$. In this embodiment the inner diameter of bearing ring $1^1$ is not increased in the area of the surfaces supporting followers $8^1$ (see FIGURE 4). In this embodiment wedges 10 also are of less height than followers $8^1$.

Having described the invention we claim:

1. A bearing ring mounting for a rotary drum comprising a plurality of projections on the outer periphery of said drum and having intermediate spaces around the periphery, a plurality of followers welded to the bearing ring and oriented to register with said intermediate spaces when said ring registers longitudinally of said drum with said projections, said ring having an inner diameter sufficiently greater than the outer diameter of said projections and said drum to permit free thermal expansion of said drum radially of said bearing ring, said intermediate spaces having a greater width than said followers and a greater depth than the height of said followers to permit free thermal expansion of said drum, and wedges between said projections and the sides of said followers to close said intermediate spaces around the periphery of said drum.

2. A combination according to claim 1 wherein said projections comprise plates arcuately bent to conform to said drum periphery and arranged in two rows around said periphery and wherein said intermediate spaces are defined by side surfaces of said plates running longitudinally of said drum.

3. A combination according to claim 2 including strips secured to said plates in alignment with a periphery of said drum to define lateral limits along said drum for said bearing ring.

4. A combination according to claim 2 wherein said followers are arranged in two rows on said bearing ring, the followers in the two rows being aligned in pairs longitudinally of the drum, whereby followers register with the intermediate spaces for the two rows of plates when said ring is mounted on said drum.

5. A combination according to claim 1 wherein said bearing ring has an increased inner diameter at least in the portion of the inner surface supporting said followers.

6. A combination according to claim 1 wherein said projections on the outer drum periphery are beveled adjacent their intermediate spaces whereby said bevels accommodate the weld beads joining said followers to said bearing ring.

7. A combination according to claim 1 wherein said wedges are of less height radial of said drum than said followers.

8. A combination according to claim 1 wherein said wedges are fitted into said intermediate spaces to permit slippage between said projections and said followers when said drum expands and said wedges are secured by a light weld to said drum.

References Cited

UNITED STATES PATENTS

| | | | |
|---|---|---|---|
| 1,670,381 | 5/1928 | Rogers | 287—52.07 X |
| 3,096,127 | 7/1963 | Parker | 308—36 |
| 3,373,625 | 3/1968 | Keller | 287—52.04 |

CARROLL B. DORITY, Jr., Primary Examiner

U.S. Cl. X.R.

287—52.04; 308—36, 236